US009465556B2

(12) United States Patent
Chiu et al.

(10) Patent No.: US 9,465,556 B2
(45) Date of Patent: Oct. 11, 2016

(54) RAID 0 DISK ARRAY SYSTEM AND DATA PROCESSING METHOD FOR DIVIDING READING COMMAND TO READING COMMAND SEGMENTS AND TRANSMITTING READING COMMAND SEGMENTS TO DISKS OR DIRECTLY TRANSMITTING READING COMMAND TO ONE OF DISKS WITHOUT DIVIDING

(71) Applicant: ASMedia Technology Inc., New Taipei (TW)

(72) Inventors: Ming-Hui Chiu, New Taipei (TW); Chia-Hsin Chen, New Taipei (TW); Yung-Chi Hwang, New Taipei (TW)

(73) Assignee: ASMEDIA TECHNOLOGY INC., New Taipei (TW)

( * ) Notice: Subject to any disclaimer, the term of this patent is extended or adjusted under 35 U.S.C. 154(b) by 91 days.

(21) Appl. No.: 14/273,528

(22) Filed: May 8, 2014

(65) Prior Publication Data
US 2014/0351509 A1    Nov. 27, 2014

(30) Foreign Application Priority Data
May 22, 2013   (TW) .............................. 102118070 A

(51) Int. Cl.
*G06F 13/00*    (2006.01)
*G06F 3/06*    (2006.01)
*G06F 11/00*    (2006.01)

(52) U.S. Cl.
CPC ............ *G06F 3/0659* (2013.01); *G06F 3/061* (2013.01); *G06F 3/0689* (2013.01); *G06F 3/0604* (2013.01); *G06F 11/00* (2013.01); *G06F 2003/0692* (2013.01); *G06F 2212/262* (2013.01)

(58) Field of Classification Search
CPC .. G06F 3/0659; G06F 3/0604; G06F 3/0689; G06F 2003/0692; G06F 3/061; G06F 11/00
USPC .......................................... 711/114, 154, 158
See application file for complete search history.

(56) References Cited

U.S. PATENT DOCUMENTS 7,155,569 B2    12/2006 Johnson et al.
2003/0225794 A1*  12/2003 Soulier ............... G06F 11/2087
(Continued)

FOREIGN PATENT DOCUMENTS

TW    200721125    6/2007

OTHER PUBLICATIONS

The RAIDBook, A Source Technology for RAID Technology, First Edition, The RAID Advisory Board, Lino Lakes, MN, Jun. 9, 1993, entire pages.*

*Primary Examiner* — Hong Kim
(74) *Attorney, Agent, or Firm* — CKC & Partners Co., Ltd.

(57) ABSTRACT

A disk array system and a data processing method are provided. The data processing method is applied to the disk array system. The disk array system is a redundancy array of independent disk 0 (RAID 0) system. The disk array system includes a plurality of disks. The data processing method includes: receiving a reading command; determining whether to divide the reading command to a plurality of reading command segments according to the reading command; and assigning the reading command to a corresponding disk of the disks to read data stored in the corresponding disk accordingly when it is determined that the reading command is not divided.

6 Claims, 3 Drawing Sheets

(56) References Cited

U.S. PATENT DOCUMENTS

| | | | |
|---|---|---|---|
| 2004/0034736 A1* | 2/2004 | Horn | G06F 3/0607 711/114 |
| 2006/0123167 A1* | 6/2006 | Jeppsen | G06F 3/061 710/106 |
| 2007/0011489 A1 | 1/2007 | Li et al. | |
| 2007/0050538 A1* | 3/2007 | Northcutt | G06F 3/0605 711/112 |
| 2007/0115731 A1 | 5/2007 | Hung | |
| 2009/0177838 A1* | 7/2009 | Haustein | G06F 3/0617 711/114 |
| 2010/0005211 A1* | 1/2010 | Wen | H05K 7/1429 710/302 |
| 2010/0199041 A1* | 8/2010 | Schnapp | G06F 3/0605 711/114 |
| 2010/0211736 A1* | 8/2010 | Chen | G06F 11/1096 711/114 |
| 2010/0306468 A1 | 12/2010 | Shionoya | |
| 2013/0124777 A1* | 5/2013 | Stenfort | G06F 3/0605 711/102 |
| 2014/0059295 A1* | 2/2014 | Northcutt | G06F 3/0605 711/114 |

* cited by examiner

RAID 0 DISK ARRAY SYSTEM AND DATA PROCESSING METHOD FOR DIVIDING READING COMMAND TO READING COMMAND SEGMENTS AND TRANSMITTING READING COMMAND SEGMENTS TO DISKS OR DIRECTLY TRANSMITTING READING COMMAND TO ONE OF DISKS WITHOUT DIVIDING

CROSS-REFERENCE TO RELATED APPLICATION

This application claims the priority benefit of Taiwan application serial No. 102118070, filed on May 22, 2013. The entirety of the above-mentioned patent application is hereby incorporated by reference herein and made a part of specification.

BACKGROUND OF THE INVENTION

1. Field of the Invention

The disclosure relates to a disk array system and a data processing method.

2. Description of the Related Art

As the electronic technology develops, a disk array system stored data is widely used in electronic devices, such as a personal computer (PC) and a network server.

The disk array system may be a redundancy array of independent disks 0 (RAID 0) system which includes a plurality of disks. When operating the writing process in RAID 0 system, the data are divided to a plurality of data segments, and then the data segments are written to different disks, respectively. When operating the reads data in RAID 0 system, the data segments are taken out from different disks and reassembled, and then are sent back to a host.

However, since the RAID 0 system should reassemble the data segments according to each of the reading commands, the RAID 0 system cannot apply a disk access technology, such as a native command queuing (NCQ) technology, to continuously read the data stored in the disk and improve a data access speed.

BRIEF SUMMARY OF THE INVENTION

A disk array system includes a plurality of disks and a control device. The control device receives a reading command and determines whether to divide the reading command to a plurality of reading command segments according to the reading command. When the control device determines not to divide the reading command, the control device assigns the reading command to a corresponding disk of the disks to read data stored in the corresponding disk according to the reading command.

When the control device determines to divide the reading command, the control device divides the reading command to the reading command segments, and the reading command segments are assigned to the disks, respectively, to make the disks read the data according to the reading command segments.

A data processing method is applied to a disk array system. The disk array system is a RAID 0 system and includes a plurality of disks. The data processing method includes following steps: receiving a reading command, determining whether to divide the reading command to a plurality of reading command segments according to the reading command; and assigning the reading command to a corresponding disk of the disks to read data stored in the corresponding disk accordingly when the reading command is not divided.

In sum, when the disk array system continuously receives a plurality of reading commands which do not need to be divided, the reading commands are assigned to corresponding disks, respectively, to improve a data reading speed and extend a service life of the disks.

These and other features, aspects and advantages of the present disclosure will become better understood with regard to the following description, appended claims and accompanying drawings.

DETAILED DESCRIPTION OF THE EMBODIMENTS

Figure 1:
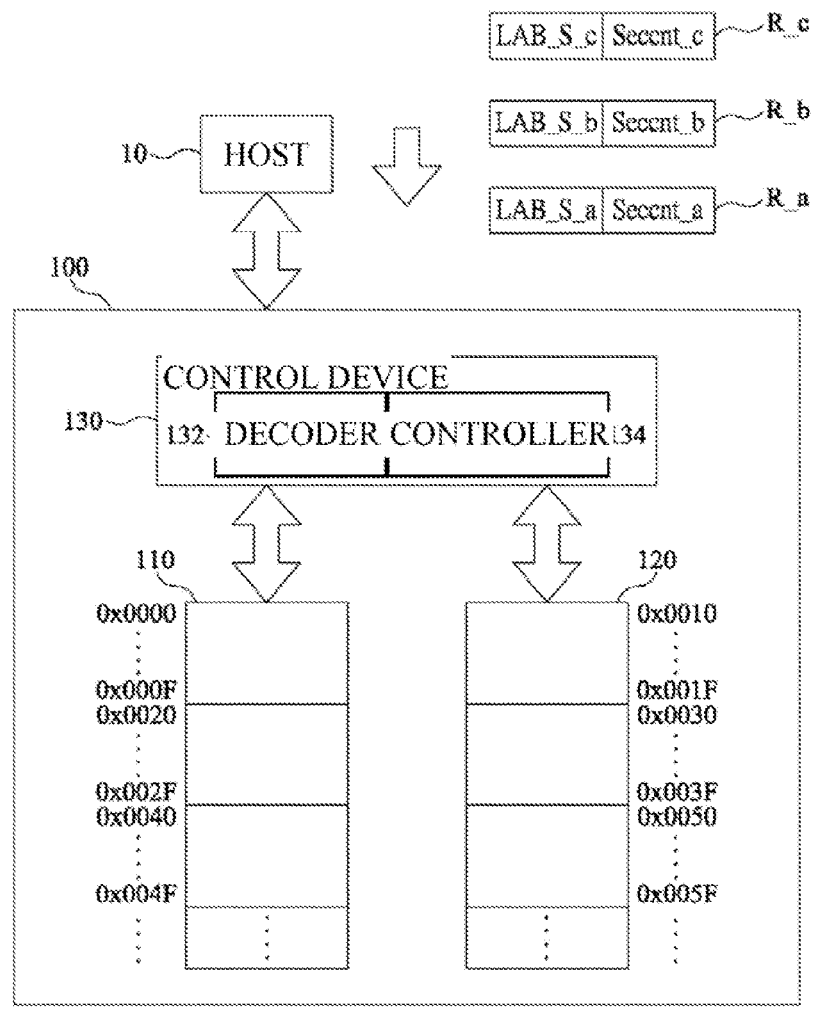
FIG. 1 is a schematic diagram showing a disk array system in an embodiment.

FIG. 1 is a schematic diagram showing a disk array system 100 in an embodiment. The disk array system 100 includes a control device 130 and a plurality of disks, such as a first disk 110 and a second disk 120. The control device 130 is electrically connected to the first disk 110, the second disk 120 and a host 10, respectively.

In the embodiment, the control device 130 may be achieved via a logic circuit, an integrated circuit, a programmable logic device (PLD) or a complex programmable logic device (CPLD). Furthermore, the control device 130 may include a decoder 132 and a controller 134, which is not limited herein.

In the embodiment, the first disk 110 and the second disk 120 includes a plurality of stripes, respectively. Each of the stripes includes a plurality of storage spaces (the number of the storage spaces of each of the stripes is called a stripe size, which can be set by the user). Each of the storage spaces corresponds to one of multiple logic block addresses (LBA) of the disk array system 100, respectively. That means, each of the multiple LBAs of the disk array system 100 directs one storage space of the first disk 110 or the second disk 120, respectively. The storage space directed by the LBA of the disk array system 100 are configured alternately in the first disk 110 and the second disk 120, in which the data stored in the first disk 110 are different from the second disk 120, to form a disk configuration of the RAID 0 system. In the embodiment, the number of the disks is two which is not limited herein.

Figure 2:
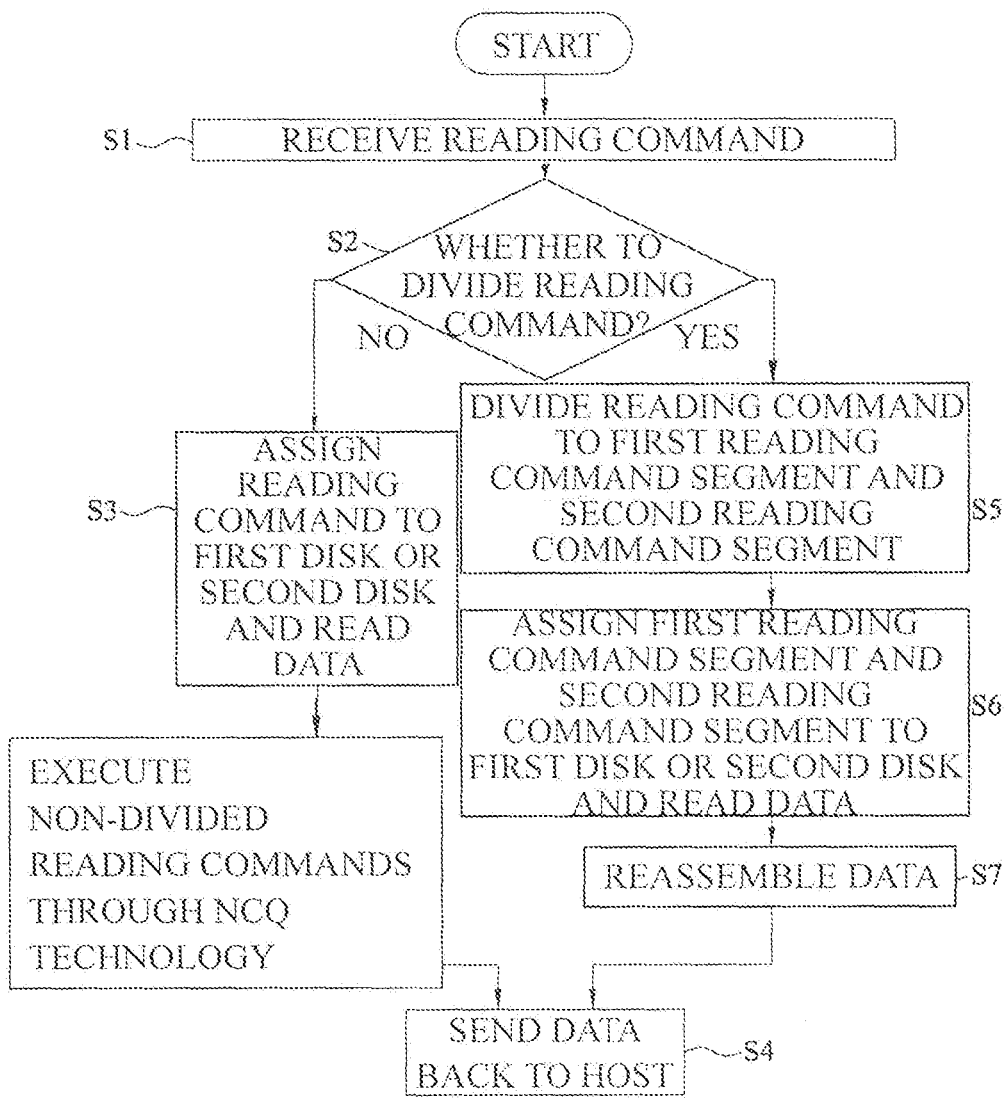
FIG. 2 is a flow chart showing a data processing method in an embodiment.

FIG. 2 is a flow chart showing a data processing method 200 in an embodiment. The data processing method 200 can be applied to the disk array system 100 in FIG. 1, which is not limited herein.

The steps of the data processing method 200 illustrated hereinafter do not need to be executed in a specific sequence unless expressly stated. Moreover, the steps can be executed at the same time.

First, after the disk array system 100 starts operation, the control device 130 receives a reading command from the host 10 (step S1). The reading command includes a data starting address LBA_S and a data length Seccnt. The data starting address LBA_S is a start LBA of the data corresponding to the reading command in the disk array system 100, and the data length Seccnt is the data size corresponding reading command.

Then, the control device 130 determines whether to divide the reading command to a plurality of reading command segments, such as a first reading command segment and a second reading command segment, accordingly (step S2). The first reading command segment only corresponds to the data stored in the first disk 110, and the second reading command segment only corresponds to the data stored in the second disk 120.

When the control device 130 determines not to divide the reading command, the control device 130 assigns the reading command to the first disk 110 or the second disk 120 according to the data starting address LBA_S of the reading command, so as to read the data stored in the first disk 110 or the second disk 120 according to the reading command (step S3). The control device 130 sends the data back to the host 10 (step S4).

On the other hand, when the control device 130 determines that the reading command needs to be divided into the first reading command segment and the second reading command segment, the control device 130 divides the reading command to the first reading command segment and the second reading command segment (step S5). The control device 130 assigns the first reading command segment and the second reading command segment to the first disk 110 and the second disk 120, respectively, so as to make the first disk 110 read the data segments stored in the first disk 110 according to the first reading command segment, and make the second disk 120 read the data segments stored in the second disk 120 according to the second reading command segment (step S6). The control device 130 reassembles the data segments from the first disk 110 and the second disk 120, and the reassembled data segments are taken as the data read by the disk array system 100 according to the reading command (step S7). The control device 130 sends the data back to the host 10 (step S4).

As stated above, when the disk array system 100 continuously receives multiple reading commands which do not need to be divided from the host 10, the control device 130 assigns the reading, commands to the first disk 110 and the second disk 120, respectively, so as to read the data stored in the first disk 110 and the second disk 120 at the same time according to the reading commands to increase the data reading speed.

Furthermore, when the disk array system 100 continuously receives multiple reading commands which do not need to be divided from the host 10, the disk array system 100 can also apply a disk access technology, such as a native command queuing (NCQ) technology, to continuously read the data stored in the first disk 110 or the second disk 120 to effectively improve the data reading speed and extend the service life of the disks. The data processing method 200 can be applied to various transmission interfaces, such as a serial advanced technology attachment (SATA) interface, a small computer system interface (SCSI) interface or a universal serial bus (USB) interface, which is not limited herein.

Operations relating to determining whether to divide the reading, command segments to the first reading command segment and the second reading command segment are illustrated hereinafter, which is not limited herein.

Figure 3:
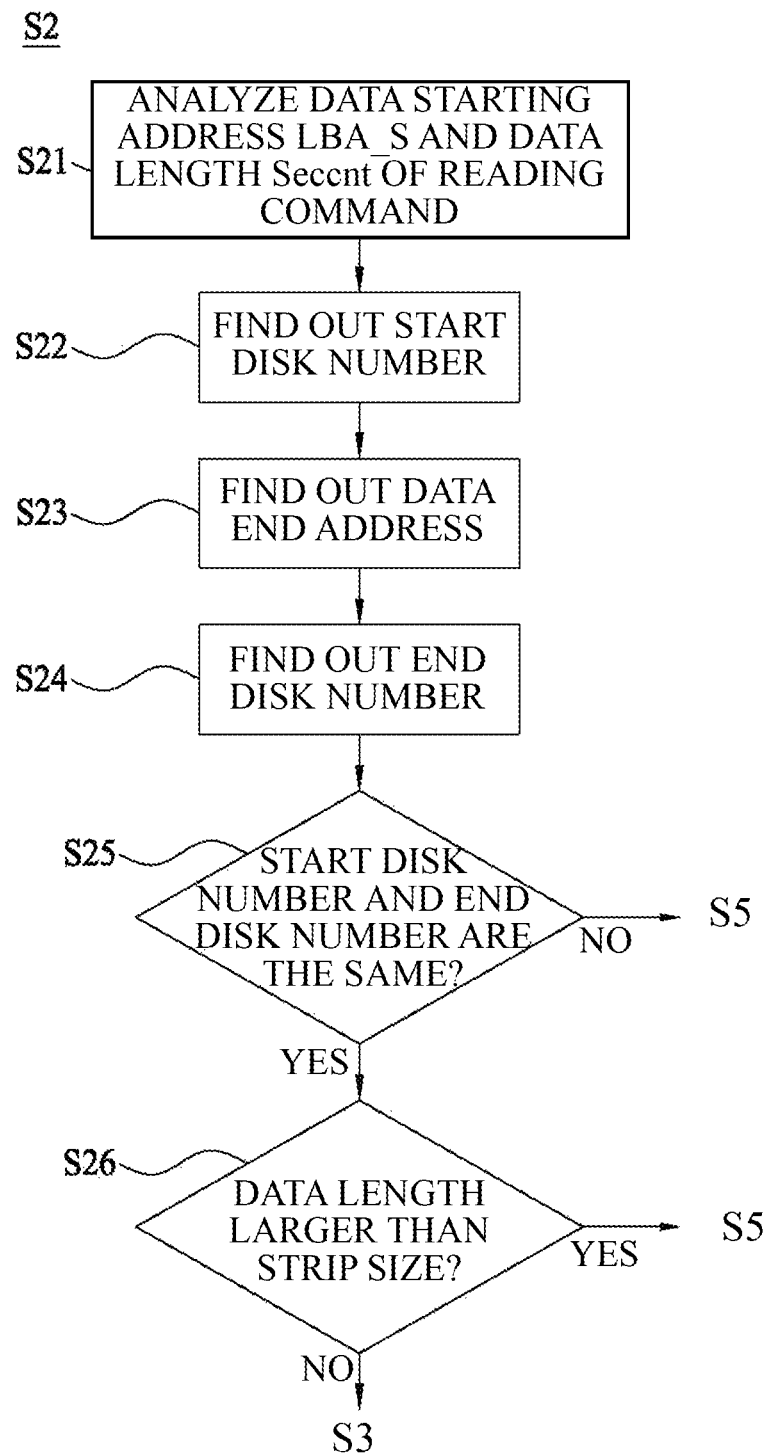
FIG. 3 is a flow chart showing a specific step of the data processing method in FIG. 2.

FIG. 3 is a flow chart showing a specific step of the data processing method 200 in FIG. 2. The steps illustrated hereinafter do not need to be executed in a specific sequence unless expressly stated. Moreover, the steps can be executed at the same time.

First, the control device 130 analyzes the data starting address LBA_S and the data length Seccnt of the reading command via the decoder 132 (step S21). Then the control device 130 finds out a start disk number DS via the controller 134 according to the data starting address LBA_S and the strip size (step S22). The start disk number DS is the number of the disk directed by the data starting address LBA_S. On the other hand, the control device 130 adds the data starting address LBA_S and the data length Seccnt to obtain a data end address LBA_E via the controller 134 (step S23). The data end address LBA_E is the end LBA of the data corresponding to the reading command in the disk array system 100.

The control device 130 finds out an end disk number DE via the controller 134 according to the data end address LBA_E and the strip size (step S24). The end disk number DE is the number of the disk directed by the data end address LBA_E. The control device 130 compares the start disk number DS and the end disk number DE via the controller 134 to determine whether to divide the reading command (step S25).

If the start disk number DS and the end disk number DE corresponding to the reading command are different, it means that the data corresponding to the reading command are stored in the first disk 110 and the second disk 120, respectively. The controller 134 determines the reading command needs to be divided, and executes the step S5.

If the start disk number DS and the end disk number DE corresponding to the reading command are the same, the control device 130 further determines whether the data length of the reading command is larger than the strip size via the controller 134 (step S26). If yes, it means that the data corresponding to the reading command are stored in the first disk 110 and the second disk 120, respectively. Thus, the controller 134 determines the reading command needs to be divided, and executes the step S5.

If no, it means that the data corresponding to the reading command are stored in the first disk 110 or the second disk 120. The controller 134 determines the reading command does not need to be divided, and executes the step S3.

In other words, the control device 130 can determine whether the data corresponding to each reading command are stored in both of the first disk 110 and the second disk 120 or stored in one of the first disk 110 and the second disk 120 via the controller 134, so as to determine whether to divide the reading command.

In an embodiment, the strip size may include 16 storage spaces directed by the LBAs. Thus, the storage spaces directed by the LBAs, such as 0x0000 to 0x000F; 0x0020 to 0x002F and 0x0040 to 0x004F, of the disk array system 100 are in the first disk 110. The storage spaces directed by the LBAs, such as 0x0010 to 0x001F, 0x0030 to 0x003F and 0x0050 to 0x005F, of the disk array system 100 are in the second disk 120.

In the embodiment, the disk array system 100 continuously receives the reading commands R_a to R_c.

If the data starting address LBA_S_a of the reading command R_a is 0x0001 and the data length Seccnt_a is 0x0F, the start disk number DS_a corresponding to the reading command R_a is 0, which refers to the first disk 110. The data end address LBA_E_a of the reading command R_a is LBA_S_a+Seccnt_a−1=0x000F and thus the end disk number DE_a corresponding to the reading command R_a is 0, which refers to the first disk 110.

Since the start disk number DS_a and the end disk number DE_a are the same, and the data length Seccnt_a is not larger than the strip size, the control device 130 determines the reading command R_a does not need to be divided via the controller 134, and assigns the reading command R_a to the first disk 110 to read the data according to the start disk number corresponding to the reading command R_a.

If the data starting address LBA_S_b of the reading command R_b is 0x0010 and the data length Seccnt_b is 0x0F the start disk number DS_b corresponding, to the reading command R_b is 1, which refers to the second disk 120. The data end address LBA_E_b of the reading command R_b is LBA_S_b+Seccnt_b−1=0x001E, and thus the end disk number DE_b corresponding to the reading command R_b is 1, which refers to the second disk 120.

Since the start disk number DS_b and the end disk number DE_b are the same, the control device 130 determines that the reading command R_b does not need to be divided via the controller 134, and assigns the reading command R_b to the second disk 120 to read the data according to the start disk number corresponding to the reading command R_b.

If the data starting address LBA_S_c of the reading command R_c is 0x0101 and the data length Seccnt_c is 0x10, the start disk number DS_c corresponding to the reading command R_c is 0, which refers to the first disk 110. The data end address LBA_E_c of the reading command R_c LBA_S_c+Seccnt_c−1=0x0110, and thus the end disk number DE_c corresponding to the reading command R_c is 1, which refers to the second disk 120.

Since the start disk number DS_c and the end disk number DE_c are different, the control device 130 determines the reading command R_c needs to be divided via the controller 134, and divides the reading command R_c to the first reading command segment and the second reading command segment.

As stated above, the control device 130 can determines whether to divide the reading command segments to the first reading command segment and the second reading command segment.

Methods of calculating the start disk number DS or the end disk number DE of the reading command are illustrated hereinafter, which is not limited herein.

In the embodiments stated above, the method of calculating the start disk number DS or the end disk number DE corresponding to the reading command may be setting a first operating parameter S_size_1 according to the strip size. The first operating parameter S_size_1 may be a binary expression of the stripe size. For example, if the stripe size is 16, the first operating parameter S_size_1 is 8'b0001_0000. Then, the control device 130 logically adds a lowest byte of the first operating parameter S_size_1 and a lowest byte of the data starting address LBA_S or the data end address LBA_E via the controller 134 to get a first operating value. The control device 130 calculates the start disk number DS or the end disk number DE corresponding to the reading command according to whether the first operating value has the number "1".

For example, the control device 130 logically adds the lowest byte (8'b0001_0000) of the first operating parameter S_size_1 and the lowest byte (8'b0000_0001) of the data starting, address LBA_S_a (0x0001) of the reading command R_a via the controller 134 to get the first operating value 8'b0000_0000. The first operating value does not have the number "1", and thus the start disk number DS_a is 0.

The control device 130 logically adds the lowest byte (8'b0001_0000) of the first operating parameter S_size_1 and the lowest byte (8'b0001_1111) of the data end address LBA_E_a (0x000F) of the reading command R_a to get the first operating value 8'b0001_0000. The first operating value does not have the number 1, and thus the end disk number DE_a is 0.

The control device 130 logically adds the lowest byte (8'b0001_0000) of the first operating parameter S_size_1 and the lowest byte (8'b0001_0000) of the data starting address LBA_S_b (0x0010) of the reading command R_b via the controller 134 to get the first operating value 8'b0001_0000. The first operating value has the number "1", and thus the start disk number DS_b is 1.

The control device 130 logically adds the lowest byte (8'b0001_0000) of the first operating parameter S_size_1 and the Slowest byte (8'b0001_1110) of the data end address LBA_E_b (0x001E) of the reading command R_b to get the first operating value 8'b0001_0000. The first operating value has the number 1, and thus the end disk number DE_b is 1.

The control device 130 logically adds the lowest byte (8'b0001_0000) of the first operating parameter S_size_1 and the lowest byte (8'b0000_0000) of the data starting address LBA_S_c (0x0101) of the reading command R_c via the controller 134 to get the first operating value 8'b0000_0000. The first operating value does not have the number "1", and thus the start disk number DS_c is 0.

The control device 130 logically adds the lowest byte (8'b0001_0000) of the first operating parameter S_size_1 and the lowest byte (8'b0001_0000) of the data end address LB_S_c (0x0110) of the reading command R_c to get the first operating value 8'b0001_0000. The first operating value has the number 1, and thus the end disk number DE_c is 1.

In another embodiment, the method of calculating the start disk number DS or the end disk number DE corresponding to the reading command may also be that the control device 130 sets a second operating parameter S_size_2 via the controller 134 according to the strip size. The second operating parameter S_size_2 may be a base 2 log of the stripe size. For example, if the stripe size is 16, the second operating parameter S_size_2 is 0x04. Then, the control device 130 shifts the data starting address LBA_S or the data end address LBA_E to the right via the controller 134 according to the second operating parameter S_size_2 to get a second operating value. The control device 130 takes a lowest bit of the second operating value as the start disk number DS or the end disk number DE via the controller 134.

For example, when the second operating parameter S_size_2 is 0x04, the control device 130 shifts the data starting address LBA_S_a (0x0001) of the read command R_a to the right by four bits via the controller 134 to get the second operating value 0x0000. The lowest bit of the second operating value is 0, and thus the start disk number DS_a is 0. On the other hand, the control device 130 shifts the data starting address LBA_E_a (0x000F) of the read command R_a to the right by four bits via the controller 134 to get the second operating value 0x0000. The lowest bit of the second operating value is 0, and thus the end disk number DE_a is 0.

The control device 130 shifts the data starting address LBA_S_b (0x0010) of the read command R_b to the right by four bits via the controller 134 to get the second operating value 0x0001. The lowest bit of the second operating value is 1, and thus the start disk number DS_b is 1. On the other hand, the control device 130 shifts the data starting address LBA_E_b (0x001E) of the read command R_b to the right by four bits via the controller 134 to get the second operating value 0x000F. The lowest bit of the second operating value is 1, and thus the end disk number DE_b is 1.

The control device 130 shifts the data starting address LBA_S_c (0x0101) of the read command R_c to the right by four bits via the controller 134 to get the second operating value 0x0010. The lowest bit of the second operating value is 0, and thus the start disk number DS_c is 0. On the other hand, the control device 130 shifts the data starting address LBA_E_c (0x0110) of the read command R_c to the right by four bits via the controller 134 to get the second operating value 0x0011. The lowest bit of the second operating value is 1, and thus the end disk number DE_c is 1.

As stated above the control device 130 can calculate the start disk number DS or the end disk number DE corresponding to the reading command.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A disk array system, comprising:
   a plurality of disks; and
   a control device electrically connected to the disks, receiving a plurality of reading commands and determining whether to divide each of the reading commands according to the reading commands, wherein each of the reading commands includes a data starting address and a data length, the control device obtains a start disk number according to the data starting address and a strip size and obtains an end disk number according to the data starting address, the data length, and the strip size;
   wherein the control device determines not to divide the one of the reading commands when the start disk number and the end disk number are identical and the data length is not larger than the strip size, the control device assigns the one of the reading commands to a corresponding disk of the disks to read data stored in the corresponding disk according to the one of the reading commands, and
   the control device determines to divide the one of the reading commands when the start disk number and the end disk number are different, the control device divides the one of the reading commands to reading command segments, and the reading command segments are assigned to the disks, respectively, to make the disks read the data according to the reading command segments;
   when one of the disks continuously receives more than one non-divided reading commands of the reading commands which is not divided, the one of the disks executes the non-divided reading commands through native command queuing technology to continuously read data stored therein.

2. The disk array system according to claim 1, wherein the control device further determines whether the data corresponding to the one of the reading commands is stored in one disk or multiple disks of the disks, and the control device determines whether to divide the one of the reading commands accordingly.

3. The disk array system according to claim 1, wherein the disk array system is a redundancy array of independent disk 0 (RAID 0) system.

4. A data processing method, applied to a disk array system, wherein the disk array system is a redundancy array of independent disk 0 (RAID 0) system, and the disk array system includes a plurality of disks, the data processing method comprising following steps:
   receiving a plurality of reading commands;
   determining whether to divide each of the reading commands according to the reading commands, wherein each of the reading commands includes a data starting address and a data length; and
   assigning one of the reading commands to a corresponding disk of the disks to read data stored in the corresponding disk accordingly when the one of the reading commands is not divided; and
   when one of the disks continuously receives more than one non-divided reading commands of the reading commands which is not divided, controlling the one of the disks to execute the non-divided reading commands through native command queuing technology to continuously read data stored therein,
   wherein the step of determining whether to divide each of the reading commands according to the reading commands comprises:
   obtaining a start disk number according to the data starting address and a strip size;
   obtaining an end disk number according to the data starting address, the data length, and the strip size; and
   determining to divide the one of the reading commands when the start disk number and the end disk number are different, and determining to not divide the one of the reading commands when the start disk number and the end disk number are identical and the data length is not larger than the strip size.

5. The data processing method according to claim 4, the data processing method further includes:
   dividing the one of the reading commands to reading command segments when the one of the reading commands needs to be divided, and assigning the reading command segments to the disks, respectively, to read the data stored in the disks according to the reading command segments.

6. The data processing method according to claim 4, wherein the step of determining whether to divide the one of the reading commands to the reading command segments includes:
   determining whether the data corresponding to the one of the reading command is stored in one disk or multiple disks of the disks.

* * * * *